US012359030B2

(12) United States Patent
Liu et al.

(10) Patent No.: US 12,359,030 B2
(45) Date of Patent: Jul. 15, 2025

(54) METHOD FOR PREPARING UNIFORMLY-CURED SOLID LOADING TIRES FROM HIGH-MODULUS GRAPHENE OXIDE/NATURAL RUBBER COMPOSITE

(71) Applicant: NORTH UNIVERSITY OF CHINA, Taiyuan (CN)

(72) Inventors: Yaqing Liu, Taiyuan (CN); Haoyu Duan, Taiyuan (CN); Shuaishuai Cheng, Taiyuan (CN); Guizhe Zhao, Taiyuan (CN)

(73) Assignee: NORTH UNIVERSITY OF CHINA, Taiyuan (CN)

( * ) Notice: Subject to any disclaimer, the term of this patent is extended or adjusted under 35 U.S.C. 154(b) by 0 days.

(21) Appl. No.: 19/013,872

(22) Filed: Jan. 8, 2025

(65) Prior Publication Data

US 2025/0145774 A1 May 8, 2025

Related U.S. Application Data

(63) Continuation of application No. PCT/CN2024/074010, filed on Jan. 25, 2024.

(51) Int. Cl.
*C08J 3/24* (2006.01)
*B60C 1/00* (2006.01)
(Continued)

(52) U.S. Cl.
CPC ................. *C08J 3/247* (2013.01); *B60C 1/00* (2013.01); *C08J 3/2053* (2013.01); *C08J 3/22* (2013.01);
(Continued)

(58) Field of Classification Search
None
See application file for complete search history.

(56) References Cited

U.S. PATENT DOCUMENTS

2019/0177516 A1    6/2019  Wang et al.

FOREIGN PATENT DOCUMENTS

CN          1137981 A     12/1996
CN        109081961 A     12/2018
(Continued)

OTHER PUBLICATIONS

CN114591545A, 2022, machine translation (Year: 2022).*
(Continued)

*Primary Examiner* — Satya B Sastri

(57) ABSTRACT

A method for preparing a uniformly-cured solid loading tire from a high-modulus graphene oxide/natural rubber composite is provided. A high-modulus graphene oxide/carbon black/natural rubber mixture sheet and two high-viscosity graphene oxide/carbon black/natural rubber mixture sheets are prepared, where a weight ratio of graphene oxide to natural rubber to carbon black to an interface modifying agent to an anti-aging agent to an antioxidant to a vulcanization accelerator to an activator to a softener to a vulcanizing agent is 0.5-5:100:40-120:1-20:1-10:1-10:1-20:1-20:1-20:1-20. The high-modulus rubber mixture sheet is sandwiched between the two high-viscosity rubber mixture sheets to form a sandwich-structure rubber mixture laminate, which is then processed into a strip. The strip is wound along a surface of a hub of a loading wheel, and then the hub is transferred to a mold for vulcanization to obtain the desired tire.

8 Claims, 1 Drawing Sheet

(51) Int. Cl.

| | |
|---|---|
| *C08J 3/205* | (2006.01) |
| *C08J 3/22* | (2006.01) |
| *C08K 3/04* | (2006.01) |
| *C08K 3/22* | (2006.01) |
| *C08K 5/09* | (2006.01) |
| *C08K 5/18* | (2006.01) |
| *C08K 5/47* | (2006.01) |
| *C08K 5/548* | (2006.01) |

(52) U.S. Cl.
CPC ............ *C08K 3/042* (2017.05); *C08K 3/22* (2013.01); *C08K 5/09* (2013.01); *C08K 5/18* (2013.01); *C08K 5/47* (2013.01); *C08K 5/548* (2013.01); *C08J 2307/00* (2013.01); *C08K 2003/2296* (2013.01)

(56) References Cited

FOREIGN PATENT DOCUMENTS

| CN | 114591545 A | * | 6/2022 | ............ C08J 3/22 |
|---|---|---|---|---|
| CN | 114891281 A | | 8/2022 | |
| CN | 115073826 A | | 9/2022 | |
| CN | 115873319 A | | 3/2023 | |
| CN | 116855000 A | | 10/2023 | |
| WO | 2022100629 A1 | | 5/2022 | |

OTHER PUBLICATIONS

General Administration of Quality Supervision, Inspection and Quarantine of the People's Republic of China et al., "(GB/T531.1-2008) Rubber, vulcanized or thermoplastic—Determination of indentation hardness—Part 1: Duromerer method (Shore hardness)", National Standard of the People's Republic of China, Jun. 4, 2008, Entire document.

General Administration of Quality Supervision, Inspection and Quarantine of the People's Republic of China et al., "(GB/T528-2009) Rubber, vulcanized or thermoplastic—Determination of tensile stress-strain properties", National Standard of the People's Republic of China, Apr. 24, 2009, Entire document.

General Administration of Quality Supervision, Inspection and Quarantine of the People's Republic of China et al., "(GB/T529-2008) Rubber, vulcanized or thermoplastic—Determination of tear strength (Trouser, angle and crescent test pieces)", National Standard of the People's Republic of China, Jun. 4, 2008, Entire document.

General Administration of Quality Supervision, Inspection and Quarantine of the People's Republic of China et al., "(GB/T1687.3-2016) Rubber, vulcanized—Determination of temperature rise and resistance to fatigue in flexometer testing—Part 3: Compression flexometer (constant-strain type)", National Standard of the People's Republic of China, Dec. 13, 2016, Entire document.

* cited by examiner

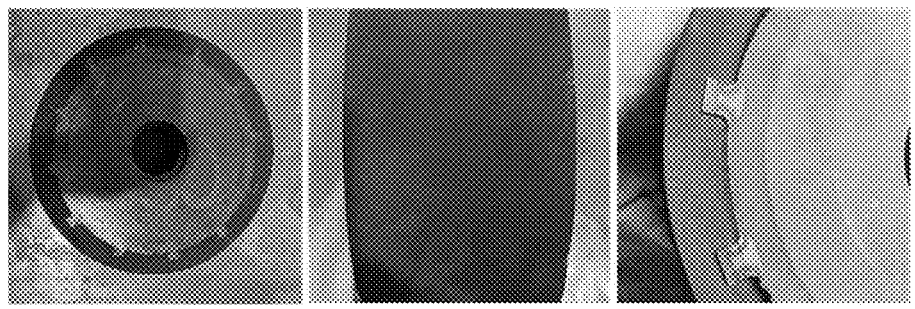

METHOD FOR PREPARING UNIFORMLY-CURED SOLID LOADING TIRES FROM HIGH-MODULUS GRAPHENE OXIDE/NATURAL RUBBER COMPOSITE

CROSS-REFERENCE TO RELATED APPLICATIONS

This application is a continuation of International Patent Application No. PCT/CN2024/074010, filed on Jan. 25, 2024, which claims the benefit of priority from Chinese Patent Application No. 202410067427.7, filed on Jan. 17, 2024. The content of the aforementioned application, including any intervening amendments thereto, is incorporated herein by reference in its entirety.

TECHNICAL FIELD

This application relates to graphene and natural rubber functional composites, and more particularly to a method for preparing uniformly-cured solid loading tires from a high-modulus graphene oxide/natural rubber composite.

BACKGROUND

Rubber has been extensively applied as an important strategic material in the industrial manufacturing and national defense due to its unique viscoelasticity. Natural rubber (NR) has excellent elasticity, desirable wear, aging and corrosion resistances, making it an ideal material for the preparation of solid rubber tires. However, due to poor hardness, NR is prone to severe deformation under the action of an external force, which makes it not suitable for the manufacturing of tires of heavy-duty vehicles. Moreover, the microcracking may occur, which will cause rubber damage or even failure, thereby reducing the service life of the tires. In this regard, various inorganic fillers, such as carbon black, are introduced to improve the mechanical properties of NR composites. With the continuous progress of science and technology, higher and higher requirements have been put forward for the performance of rubber composites.

In order to further improve the NR performance, many novel fillers have been developed, among which nanoparticles, such as ceramic particles, nano-diamonds, carbon nanotubes, and graphene (GE), have been widely considered as ideal materials for reinforcing the rubber matrix owing to their small size and large specific surface area. GE and its derivatives are regarded as the most ideal fillers for NR composites, and are often used to improve mechanical, electrical, thermal, and chemical properties of the NR composites. Graphene oxide (GO), as an important representative of GE derivatives, has a remarkable hydrophilicity due to the abundant presence of oxygen-containing functional groups, such as hydroxyl, epoxy group, carboxyl group, and carbonyl group, and thus exhibits excellent dispersibility in the natural latex. In addition, these oxygen-containing functional groups can improve the interfacial interaction between GO and NR matrix. Therefore, GO is widely used in the enhancement and modification of rubber, thereby improving the safety, durability, and performance of the molded solid tires.

High-modulus rubber composites are widely used in the manufacturing of rubber products, such as tire triangle rubber, automobile transmission belts, and loading tires. With the development of heavy-duty vehicles towards heavier load and higher speed, the rubber body of the loading wheel suffers from more intense shear, tension, compression, and torsion. Therefore, during the traveling of heavy-duty vehicles, the solid rubber tires will undergo an obvious temperature rise, which may cause tire high-temperature cracking, chipping, and block shedding. Solid rubber tires struggle with a poor cut resistance especially traveling on a complex road. Therefore, in order to satisfy the above usage requirements, the tread rubber of solid tires must have excellent comprehensive properties, such as high modulus, low dynamic heat generation, high fatigue resistance, high strength, and excellent tear resistance.

Extensive research has been conducted on the determination of vulcanization degree of different parts of solid rubber tires and vulcanization time of thick rubber products. Due to poor thermal conductivity, the rubber product cannot be uniformly and synchronously heated as the thickness increases, and the internal-external temperature difference will increase with the increase of rubber layer thickness, resulting in a significant difference of the vulcanization degrees between the internal region rubber and the external region rubber at the same vulcanization time. Therefore, the determined vulcanization parameters should ensure complete and uniform vulcanization of all parts of the rubber, namely, avoiding the insufficient vulcanization at the interior region rubber, and avoiding the excessive vulcanization at the exterior region rubber. Based on this, it is also necessary to determine the shortest vulcanization time to improve production efficiency while ensuring the product quality.

SUMMARY

This application provides a method for preparing uniformly-cured solid loading tires from a high-modulus graphene oxide/natural rubber composite to overcome the defects in the prior art.

In order to solve the above technical problems, technical solutions of this application are described as follows.

This application provides a method for preparing a uniformly-cured solid loading tire from a high-modulus graphene oxide/natural rubber composite, wherein raw materials of the high-modulus graphene oxide/natural rubber composite comprise:

100 parts by weight of a natural rubber;
40-120 parts by weight of a carbon black (CB);
0.5-5 parts by weight of a graphene oxide;
1-20 parts by weight of an activator;
1-20 parts by weight of a softener;
1-10 parts by weight of an anti-aging agent;
1-10 parts by weight of an antioxidant;
1-20 parts by weight of a vulcanization accelerator;
1-20 parts by weight of a vulcanizing agent; and
1-20 parts by weight of an interface modifying agent; and
the method comprises:

(S1) adding deionized water into a graphene oxide slurry, followed by ultrasonic dispersion to obtain a graphene oxide aqueous dispersion;

(S2) adding the graphene oxide aqueous dispersion into a natural rubber latex followed by stirring to obtain a mixed emulsion; adding a flocculant to the mixed emulsion for demulsification to obtain a crude rubber; and subjecting the crude rubber to water washing and drying to obtain a graphene oxide/natural rubber masterbatch;

(S3) subjecting the graphene oxide/natural rubber masterbatch obtained in step (S2) to internal mixing at 110-120° C. in an internal mixer, and sequentially adding the CB, the interface modifying agent, the anti-aging agent, the antioxidant, the vulcanization accelerator, the activator, and the softener, followed by internal mixing for 5-12 min to produce a first rubber mixture;

removing the first rubber mixture from the internal mixer, followed by cooling to room temperature;

subjecting the first rubber mixture to open milling in an open mill at 50-80° C. for 6-15 min, and adding the vulcanizing agent followed by mixing and mill run until the first rubber mixture is free of bubbles, so as to obtain a high-modulus graphene oxide/carbon black/natural rubber mixture; and pressing the high-modulus graphene oxide/carbon black/natural rubber mixture into a first rubber mixture sheet;

(S4) subjecting the graphene oxide/natural rubber masterbatch obtained in step (S2) to internal mixing in the internal mixer at 110-120° C., and sequentially adding the CB, the interface modifying agent, the anti-aging agent, the antioxidant, the vulcanization accelerator, the activator, and the softener, followed by internal mixing for 5-12 min to produce a second rubber mixture; removing the second rubber mixture from the internal mixer, followed by cooling to the room temperature;

subjecting the second rubber mixture to open milling in the open mill at 50-80° C. for 15-25 min, and adding the vulcanizing agent followed by mixing and mill run until the second rubber mixture is free of bubbles, so as to obtain a high-viscosity graphene oxide/carbon black/natural rubber mixture; and pressing the high-viscosity graphene oxide/carbon black/natural rubber mixture into a second rubber mixture sheet;

(S5) sandwiching the first rubber mixture sheet between two second rubber mixture sheets obtained in step (S4) to form a rubber mixture laminate with a sandwich structure; leaving the rubber mixture laminate to stand; and processing the rubber mixture laminate into a rubber mixture strip with a sandwich structure, wherein a width of the rubber mixture strip is less than a width of a metal hub of a loading wheel;

(S6) coating a surface of the metal hub with an adhesive, followed by drying; and winding the rubber mixture strip around the surface of the metal hub, wherein a winding thickness of the rubber mixture strip is a design thickness of a rubber layer of the loading wheel; and (S7) transferring the metal hub wound with the rubber mixture strip to a mold of the loading wheel, followed by a first vulcanization at a first temperature for a first preset time and a second vulcanization at a second temperature for a second preset time to obtain the uniformly-cured solid loading tire, wherein the first temperature is higher than the second temperature.

In an embodiment, the interface modifying agent is selected from the group consisting of a bis(triethoxysilylpropyl) tetrasulfide (Si69), a bis [3-(triethoxysilyl) propyl] disulfide (Si75), a (4,4,13,13-tetraethoxy-3,14-dioxa-8,9-dithia-4,13-disilahexadecane) (Si75-ES), a triethoxy (3-thiocyanatopropyl) silane (Si264), and a combination thereof.

In an embodiment, the vulcanization accelerator is selected from the group consisting of N-tert-butyl-2-benzothiazolesulfenamide, N-cyclohexylbenzothiazole-2-sulphenamide, and N-(oxydiethylene)-2-benzothiazole sulfenamide;

the anti-aging agent is selected from the group consisting of 2,6-di-tert-butyl-4-methylphenol, 2,2,4-trimethyl-1,2-dihydroquinoline polymer, and 2-mercaptobenzimidazole;

the antioxidant is selected from the group consisting of N-(1-methylisopentyl)-N'-phenyl-p-phenylenediamine, p-phenylaniline, and dilauryl thiodipropionate;

the activator is selected from the group consisting of zinc gluconate, zinc oxide, and magnesium oxide;

the softener is selected from a group consisting of stearic acid, dibutyl titanate, and dioctyl adipate; and the vulcanizing agent is selected from a group consisting of sulfur and sulfur monochloride.

In an embodiment, in step (S1), the ultrasonic dispersion is performed at a power of 100-300 W for 5-20 min; and a concentration of the graphene oxide aqueous dispersion is 2-6 mg/mL.

In an embodiment, a weight ratio of the graphene oxide in step (S1) to a rubber solid of the natural rubber latex in step (S2) to the carbon black in step (S3) to the interface modifying agent in step (S3) to the anti-aging agent in step (S3) to the antioxidant in step (S3) to the vulcanization accelerator in step (S3) to the activator in step (S3) to the softener in step (S3) to the vulcanizing agent in step (S3) is 0.5-5:100:40-120:1-20:1-10:1-10:1-20:1-20:1-20:1-20.

In an embodiment, in step (S4), a weight ratio of the graphene oxide in step (S1) to a rubber solid of the natural rubber latex in step (S2) to the carbon black in step (S4) to the interface modifying agent in step (S4) to the anti-aging agent in step (S4) to the antioxidant in step (S4) to the vulcanization accelerator in step (S4) to the activator in step (S4) to the softener in step (S4) to the vulcanizing agent in step (S4) is 0.5-5:100:40-120:1-20:1-10:1-10:1-20:1-20:1-20:1-20.

In an embodiment, in step (S5), in the rubber mixture laminate, a thickness of the first rubber mixture sheet is 3-6 mm, and a thickness of each of the two second rubber mixture sheet is 0.3-1 mm; and the rubber mixture laminate is left to stand for 20-30 h.

In an embodiment, in step (S6), the adhesive is a general-purpose adhesive, and is selected from a group consisting of Chemlok® 6125 adhesive, Chemlok® 205 adhesive, Chemlok® 6150 adhesive, and a combination thereof.

In an embodiment, in step (S7), the first vulcanization and the second vulcanization are both performed at a pressure of 10-25 MPa; the first temperature is 150-170° C., and the first preset time is 2-6 min; and the second temperature is 140-150° C., and the second preset time is 10-30 min.

Compared to the prior art, this application has the following beneficial effects.

(1) In this application, two kinds of reinforcing fillers (i.e., carbon black and graphene) are introduced, and by means of the in-situ interfacial modification, their dispersion in rubber matrix and the interfacial interaction with the rubber matrix are enhanced, so as to improve the hardness and mechanical properties of the composite, and reduce the dynamic heat generation of the molded tires, thereby slowing down the aging failure of the loading tires.

(2) Dispersion of reinforcing fillers in rubber matrix is crucial for enhancing the properties of composite. In this regard, the interface modifying agent adopted herein can significantly improve the dispersion of carbon black and GO in the NR matrix. Specifically, silane coupling agent can improve the surface properties of carbon black and GO to improve the compatibility with NR, so as to improve the interfacial interaction with the rubber matrix. Moreover, the interface modifying agent can chemically react with the NR matrix to form a vulcanized cross-linking network, which improves the bonding strength between the fillers and the rubber matrix, thereby enhancing the mechanical properties and durability of the composite.

(3) Compared to the existing tire preparation processes, this application adopts a highly-efficient aqueous phase synergistic aggregating precipitating process suitable for industrial application to prepare GO/NR masterbatch with uniform dispersion, which is further mechanically blended with carbon black to prepare the GO/CB/NR rubber mixture. The rubber mixture is finally vulcanized to prepare the solid loading tires. The above steps can be performed by conventional processes. The involved materials are green, readily-available, and low-costed. In addition, this application has simple operation, and is suitable for the industrialized production.

(4) This application adopts stepwise vulcanization of a sandwich-structure mixture rubber to improve the vulcanization effect of the solid loading tires. The first-step vulcanization is performed at a high temperature to endow the rubber mixture with a better fluidity, reducing the defects in the loading tires. The second-step vulcanization is performed at a relatively low temperature to allow complete vulcanization of the rubber mixture and prevent the decline in the mechanical properties caused by over-vulcanization, ensuring optimal vulcanization uniformity of the product. In this way, the molded solid loading tires have excellent mechanical properties, and thus the service life can be effectively extended.

BRIEF DESCRIPTION OF THE DRAWINGS

FIGURE is a digital photograph of a uniformly-cured solid loading tire prepared from a high-modulus graphene oxide/natural rubber composite according to Example 1 of the present disclosure.

DETAILED DESCRIPTION OF EMBODIMENTS

The present disclosure will be further described with reference to embodiments.

Raw materials used in the embodiments are all commercially available.

TABLE 1

Standards for performance characterization

| No. | Item | Standard |
|---|---|---|
| 1 | Shore A hardness | GB/T531.1-2008 |
| 2 | Tensile strength, MPa | GB/T528-2009 |
| 3 | Elongation at break, % | |
| 4 | 200% Tensile stress at a given elongation, MPa | |
| 5 | Tear strength, N/mm | GB/T529-2008 |
| 6 | Dynamic compression heat generation, ° C. | GB/T1687.3-2016 |

A high-modulus graphene oxide/natural rubber composite is provided, which is prepared from 100 parts by weight of a natural rubber, 0.5-5 parts (preferably 0.5-3 parts) by weight of a graphene oxide, 40-120 parts (preferably 50-90 parts) by weight of a carbon black (CB), 1-20 parts (preferably 3-10 parts) by weight of an activator, 1-20 parts (preferably 2-10 parts) by weight of a softener, 1-10 parts (preferably 2-5 parts) by weight of an anti-aging agent, 1-10 parts (preferably 2-5 parts) by weight of an antioxidant, 1-20 parts (preferably 2-8 parts) by weight of a vulcanization accelerator, 1-20 parts (preferably 2-8 parts) by weight of a vulcanizing agent, and 1-20 parts (preferably 5-10 parts) by weight of an interface modifying agent.

Example 1

Provided herein is a method for preparing a uniformly-cured solid loading tire from a high-modulus graphene oxide/natural rubber composite, which was performed as follows.

(S1) 50 g of a 10 mg/mL graphene oxide (GO) slurry was added with 50 g of deionized water, and dispersed ultrasonically at a power of 200 W for 15 min to obtain a 5 mg/mL graphene oxide aqueous dispersion.

(S2) The graphene oxide aqueous dispersion was added with 166.7 g of a natural rubber latex with 60 wt. % solid content, fully stirred to obtain a mixed emulsion. The mixed emulsion was added with 60 g of a 10 wt. % $CaCl_2$) solution for demulsification to obtain a crude rubber, which was subjected to water washing and drying to obtain a graphene oxide/natural rubber masterbatch.

(S3) The graphene oxide/natural rubber masterbatch obtained in step (S2) was subjected to internal mixing in an internal mixer at 110° C. for 4 min, sequentially added with 2 g of 2,2,4-trimethyl-1,2-dihydroquinoline polymer, 2 g of N-(1-methylisopentyl)-N'-phenyl-p-phenylenediamine, and 2 g of N-(oxydiethylene)-2-benzothiazole sulfenamide, and subjected to internal mixing for 4 min. 85 g of carbon black, 5 g of the interface modifying agent Si69, 5 g of the activator ZnO, and 2 g of stearic acid were added, followed by internal mixing for 4 min to obtain a first rubber mixture. The first rubber mixture was removed from the internal mixer, cooled to room temperature and transferred to an open mill for open milling at 60° C. for 6 min, where 2 g of sulfur was added during the open milling process. The first rubber mixture was subjected to mill run until there were no bubbles to obtain a high-modulus graphene oxide/carbon black/natural rubber mixture, which was pressed into a first rubber mixture sheet with a thickness of 5 mm.

(4) The graphene oxide/natural rubber masterbatch obtained in step (S2) was subjected in the internal mixer to internal mixing at 110° C. for 4 min. 2 g of 2,2,4-trimethyl-1,2-dihydroquinoline polymer, 2 g of N-(1-methylisopentyl)-N'-phenyl-p-phenylenediamine, and 2 g of N-(oxydiethylene)-2-benzothiazole sulfenamide were added, followed by internal mixing for 4 min. 85 g of carbon black, 5 g of the interface modifying agent Si69, 5 g of the activator ZnO, and 2 g of stearic acid were added, followed by internal mixing for 4 min to obtain a second rubber mixture. The second rubber mixture was removed from the internal mixer, cooled to the room temperature and transferred to the open mill for open milling at 60° C. for 15 min, where 2 g of sulfur was added during the open milling process. The second rubber mixture was subjected to mill run until there were no bubbles to obtain a high-viscosity graphene oxide/carbon black/natural rubber mixture, which was pressed into a second rubber mixture sheet with a thickness of 0.3 mm.

(S5) The first rubber mixture sheet was sandwiched between two second rubber mixture sheets to form a rubber mixture laminate with a sandwich structure. The rubber mixture laminate was left to stand for 20 h. The rubber mixture laminate was processed into a rubber mixture strip with a sandwich structure, where a width of the rubber mixture strip was 30 mm.

(S6) A surface of a metal hub was coated with an adhesive Chemlok® 205 adhesive, followed by drying. The rubber mixture strip was wound around the surface of the metal hub, where a winding thickness of the rubber mixture strip was 30 mm.

(S7) The metal hub wound with the rubber mixture strip was transferred to a mold of the loading wheel, followed by a first vulcanization and a second vulcanization, where the first vulcanization and the second vulcanization were both performed at a pressure of 15 MPa. The first vulcanization was performed at 160° C. for 4 min, and the second vulcanization was performed at 145° C. for 26 min, so as to obtain the uniformly-cured solid loading tire, as shown in FIGURE.

Example 2

The preparation provided herein was basically the same as that of Example 1, except that in step (S1), an addition amount of GO dispersion with a concentration of 10 mg/mL was 100 g.

Example 3

This example was basically the same as Example 1, except that an amount of the sulfur added in steps (S3) and (S4) was 2.5 g.

Performance test results of Examples 1-3 were shown in Table 2.

Comparative Example 1

This example was basically the same as Example 1, except that the GO was absent in this example.

Comparative Example 2

This example was basically the same as Example 1, except that the interface modifying agent was absent in this example.

Comparative Example 3

This example was basically the same as Example 1, except that the preparation of this example did not involve the step (S4), and the sandwich-structure rubber compound strip was replaced with a high-modulus graphene oxide/carbon black/natural rubber mixture strip to wind the metal hub.

Comparative Example 4

This example was the same as Example 1, except that a conventional vulcanization process, rather than step vulcanization including the first vulcanization and the second vulcanization, was performed in step (S7) and conditions of the conventional vulcanization process were a vulcanization pressure of 15 MPa, a vulcanization temperature of 150° C. and a vulcanization time of 30 min.

Performance test results of Comparative examples 1-4 were shown in Table 2.

TABLE 2

Performance test results of Examples 1-3 and Comparative examples 1-4

| | Example 1 | Example 2 | Example 3 | Comparative example1 | Comparative example2 | Comparative example3 | Comparative example4 |
|---|---|---|---|---|---|---|---|
| Hardness/HA | 80.5 | 81.5 | 81.5 | 79 | 79.5 | 79 | 79.5 |
| Dynamic heat generation value /° C. | 29.1 | 29.5 | 30.2 | 30.4 | 32.5 | 33.5 | 32.8 |
| Tearing strength/(N/mm) | 45.3 | 43.2 | 44.5 | 38.7 | 38.3 | 39.5 | 39.2 |
| Tensile strength/MPa | 22.53 | 21.28 | 21.75 | 19.85 | 18.88 | 19.36 | 19.86 |
| Elongation at break /% | 240.5 | 235.9 | 230.2 | 233.3 | 225.8 | 223.5 | 226.8 |
| 200% Tensile stress at a given elongation/MPa | 18.8 | 19.5 | 19.8 | 17.5 | 18.0 | 17.8 | 18.1 |

Referring to Table 2, it can be seen that the solid weight bearing tire prepared by the present disclosure has characteristics of high hardness, high modulus, low dynamic heat generation, and good mechanical properties. It can also be seen that the carbon black and the GO, as the reinforcing fillers, cooperate in-situ interfacial modification process to improve compatibility of the carbon black, the GO and the NR matrix, so as to improve the dispersion of the reinforcing fillers in rubber matrix, which can effectively improve the hardness and mechanical properties of rubber. In addition, during a step vulcanization stage of the solid weight bearing tire, the rubber mixture strip with the sandwich structure is adopted to fit the metal hub, and cooperates with the step vulcanization to obtain an optimal vulcanization uniformity, so that the formed solid weight bearing tires have excellent mechanical properties to further improve the service life of the natural rubber solid weight bearing tires.

Described above are specific embodiments of the present disclosure, which are intended to enable those of ordinary skill in the art to understand or implement the present disclosure, rather than limiting the disclosure. Although the disclosure has been described in detail with reference to the above embodiments, it should be understood by those of ordinary skill in the art that modifications and equivalent replacements can still be made to some or all of the technical features recited in the above embodiments. Such modifications and replacements made without departing from the scope of the present disclosure shall fall within the scope of this application defined by the appended claims.

What is claimed is:

1. A method for preparing a uniformly-cured solid loading tire from a high-modulus graphene oxide/natural rubber composite, raw materials of the high-modulus graphene oxide/natural rubber composite comprising 100 parts by weight of a natural rubber, 40-120 parts by weight of a carbon black, 0.5-5 parts by weight of a graphene oxide, 1-20 parts by weight of an activator, 1-20 parts by weight of a softener, 1-10 parts by weight of an anti-aging agent, 1-10 parts by weight of an antioxidant, 1-20 parts by weight of a vulcanization accelerator, 1-20 parts by weight of a vulcanizing agent, and 1-20 parts by weight of an interface modifying agent; and the method comprising:
(S1) adding deionized water into a graphene oxide slurry, followed by ultrasonic dispersion to obtain a graphene oxide aqueous dispersion;
(S2) adding the graphene oxide aqueous dispersion obtained in step (S1) into a natural rubber latex followed by stirring to obtain a mixed emulsion; adding a flocculant to the mixed emulsion for demulsification to obtain a crude rubber; and subjecting the crude rubber to water washing and drying to obtain a graphene oxide/natural rubber masterbatch;
(S3) subjecting the graphene oxide/natural rubber masterbatch obtained in step (S2) to internal mixing at 110-120° C. in an internal mixer, and sequentially adding the carbon black, the interface modifying agent, the anti-aging agent, the antioxidant, the vulcanization accelerator, the activator, and the softener, followed by internal mixing for 5-12 min to produce a first rubber mixture;
removing the first rubber mixture from the internal mixer, followed by cooling to room temperature;
subjecting the first rubber mixture to open milling in an open mill at 50-80° C. for 6-15 min, and adding the vulcanizing agent followed by mixing and mill run until the first rubber mixture is freed of bubbles, so as to obtain a high-modulus graphene oxide/carbon black/natural rubber mixture; and
pressing the high-modulus graphene oxide/carbon black/natural rubber mixture into a first rubber mixture sheet;
(S4) subjecting the graphene oxide/natural rubber masterbatch obtained in step (S2) to internal mixing in the internal mixer at 110-120° C., and sequentially adding the carbon black, the interface modifying agent, the anti-aging agent, the antioxidant, the vulcanization accelerator, the activator, and the softener, followed by internal mixing for 5-12 min to produce a second rubber mixture; removing the second rubber mixture from the internal mixer, followed by cooling to the room temperature;
subjecting the second rubber mixture to open milling in the open mill at 50-80° C. for 15-25 min, and adding the vulcanizing agent followed by mixing and mill run until the second rubber mixture is free of bubbles, so as to obtain a high-viscosity graphene oxide/carbon black/natural rubber mixture; and
pressing the high-viscosity graphene oxide/carbon black/natural rubber mixture into a second rubber mixture sheet;
(S5) sandwiching the first rubber mixture sheet obtained in step (S3) between two second rubber mixture sheets obtained in step (S4) to form a rubber mixture laminate with a sandwich structure; leaving the rubber mixture laminate to stand; and processing the rubber mixture laminate into a rubber mixture strip with a sandwich structure, wherein a width of the rubber mixture strip is less than a width of a metal hub of a loading wheel;
(S6) coating a surface of the metal hub with an adhesive, followed by drying; and winding the rubber mixture strip prepared in step (S5) around the surface of the metal hub, wherein a winding thickness of the rubber mixture strip is a design thickness of a rubber layer of the loading wheel; and
(S7) transferring the metal hub wound with the rubber mixture strip to a mold of the loading wheel, followed by a first vulcanization at a first temperature for a first preset time and a second vulcanization at a second temperature for a second preset time to obtain the uniformly-cured solid loading tire, wherein the first temperature is higher than the second temperature.

2. The method of claim 1, wherein the interface modifying agent is selected from the group consisting of a bis(triethoxysilylpropyl) tetrasulfide, a bis [3-(triethoxysilyl) propyl] disulfide, a (4,4,13,13-tetraethoxy-3,14-dioxa-8,9-dithia-4,13-disilahexadecane), a triethoxy (3-thiocyanatopropyl) silane, and a combination thereof.

3. The method of claim 1, wherein the vulcanization accelerator is selected from the group consisting of N-tert-butyl-2-benzothiazolesulfenamide, N-cyclohexylbenzothiazole-2-sulphenamide, and N-(oxydiethylene)-2-benzothiazole sulfenamide;
the anti-aging agent is selected from the group consisting of 2,6-di-tert-butyl-4-polymer, and 2-methylphenol, 2,2,4-trimethyl-1,2-dihydroquinoline mercaptobenzimidazole;
the antioxidant is selected from the group consisting of N-(1-methylisopentyl)-N'-phenyl-p-phenylenediamine, p-phenylaniline, and dilauryl thiodipropionate;
the activator is selected from the group consisting of zinc gluconate, zinc oxide, and magnesium oxide;
the softener is selected from the group consisting of stearic acid, dibutyl titanate, and dioctyl adipate; and the vulcanizing agent is selected from the group consisting of sulfur and sulfur monochloride.

4. The method of claim 1, wherein in step (S1), the ultrasonic dispersion is performed at a power of 100-300 W for 5-20 min; and a concentration of the graphene oxide aqueous dispersion is 2-6 mg/mL.

5. The method of claim 1, wherein a weight ratio of the graphene oxide in step (S1) to a rubber solid of the natural rubber latex in step (S2) to the carbon black in step (S3) to the interface modifying agent in step (S3) to the anti-aging agent in step (S3) to the antioxidant in step (S3) to the vulcanization accelerator in step (S3) to the activator in step (S3) to the softener in step (S3) to the vulcanizing agent in step (S3) is 0.5-5:100:40-120:1-20:1-10:1-10:1-20:1-20:1-20:1-20.

6. The method of claim 1, wherein a weight ratio of the graphene oxide in step (S1) to a rubber solid of the natural rubber latex in step (S2) to the carbon black in step (S4) to the interface modifying agent in step (S4) to the anti-aging agent in step (S4) to the antioxidant in step (S4) to the vulcanization accelerator in step (S4) to the activator in step (S4) to the softener in step (S4) to the vulcanizing agent in step (S4) is 0.5-5:100:40-120:1-20:1-10:1-10:1-20:1-20:1-20:1-20.

7. The method of claim 1, wherein in step (S5), in the rubber mixture laminate, a thickness of the first rubber mixture sheet is 3-6 mm, and a thickness of each of the two second rubber mixture sheet is 0.3-1 mm; and the rubber mixture laminate is left to stand for 20-30 h.

8. The method of claim 1, wherein in step (S7), the first vulcanization and the second vulcanization are both performed at a pressure of 10-25 MPa; the first temperature is 150-170° C., and the first preset time is 2-6 min; and the second temperature is 140-150° C., and the second preset time is 10-30 min.

* * * * *